Patented Apr. 16, 1935

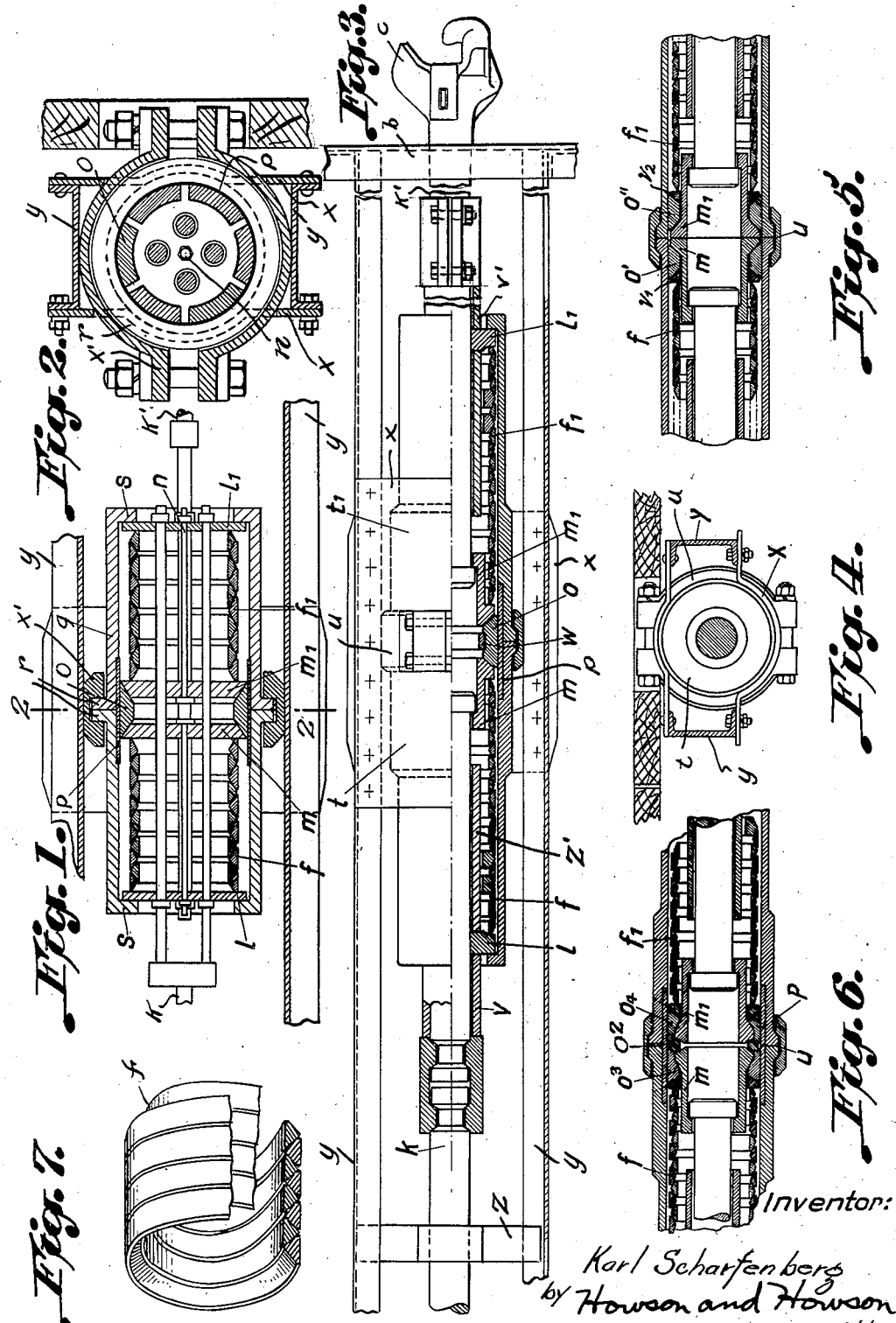

1,998,388

UNITED STATES PATENT OFFICE 1,998,388

DRAW AND BUFFER GEAR

Karl Scharfenberg, Berlin, Germany

Application July 19, 1932, Serial No. 623,405
In Germany July 11, 1931

7 Claims. (Cl. 213—8)

This invention relates to draw and buffer gear for vehicles, particularly railway vehicles.

As is well known, it is quite usual in vehicles with side buffers to employ a draw bar which runs right through the vehicle frame and on which is mounted, between spring plates, a spring through which the tractive effort is transmitted to the vehicle. Such spring may conveniently be termed a traction spring. For vehicles with central buffer couplings these latter are usually arranged to act on springs built in at the ends of the vehicle between the central longitudinal bearers or girders in somewhat similar manner to the aforementioned traction spring of a side buffer vehicle. With such an arrangement the springs propel the vehicle but the transmission of tractive and percussive forces (draw bar pull and buffering) along the train is essentially effected through the under frames of the vehicles of which the train is composed.

It is, however, also known to provide a vehicle having central buffer couplings with a draw bar and buffer device which is, in itself resilient and runs right through the vehicle frame, so that it serves to transmit the tractive and percussive forces all along the train, although the individual vehicles are each insulated from these forces by means of traction springs. In this arrangement, however, it must be regarded as a disadvantage that relative movements between the halves of the draw-bar and buffer rods act on the frame of the vehicle through the traction spring.

It is the object of the present invention to avoid this, as far as possible, and, according to the invention, a draw-bar and buffer device having relatively sprung draw-bar and buffer rods is provided with an elastic member, such as a traction spring which is inserted directly between the vehicle and the spring gear of the draw-bar and buffer rods.

Instead of the traction spring, frictional elements may be provided: these will produce the same effect and will prevent the vehicle from swinging freely to and fro in a longitudinal direction relatively to the draw-bar and buffer rods, or to the spring gear or mechanism thereof when the springs of such spring gear are compressed.

A number of constructional examples of devices according to this invention are shown in the accompanying drawing, in which—

Fig. 1 is a horizontal longitudinal section of one construction of draw bar and buffer device;

Fig. 2 is a vertical section taken as on line 2—2 of Fig. 1;

Fig. 3 is a view partly in plan and partly in a horizontal longitudinal section of a modified construction;

Fig. 4 is a vertical transverse section taken as on line 4—4 of Fig. 3 and showing the mechanism of Fig. 3 in end elevation;

Figs. 5 and 6 are partial horizontal longitudinal sections of further modifications; and Fig. 7 is a broken view of a portion of a spring used shown detached from the remainder of the device.

In the construction shown in Figures 1 and 2 wherein frictional elements are used springs $f$, $f^1$, such as are shown in Fig. 7, are used as drawbar and buffering springs and are held together between spring plates $l$, $l^1$, $m$, $m^1$ by central clamping screws $n$. The spring plates $m$, $m^1$ are made conical in shape and bear against segmental frictional elements $o$, of known kind, which, in their turn, are guided in a friction cylinder $p$. This latter is located in a cylindrical pot $q$, which may conveniently be made in two parts, so as to facilitate assembly and disassembly. Flanges $r$ at the inner ends of the pots $q$ fit in grooves in divided yokes $x^1$ which are secured in position on the flanges $r$ by bolts joining their ends. The yokes $x^1$ fit openings in plates $x$ secured to the top and bottom flanges of the central longitudinal bearers or girders $y$ so that the forces are transmitted to the car frame. The draw-bar and buffer rods may, as here shown, be passed, on the one hand, horizontally in pairs through the spring plates and, on the other hand, in pairs vertically. When traction or pressure acts from both sides on the spring gear the spring plates $l$, $l^1$ will be moved from the abutments $s$. The frictional elements $o$ are forced by the conical spring plates $m$, $m^1$ against the inner walls of the friction cylinder $p$. The friction thus produced holds the vehicle fast, relatively to the springs, on the draw-bar and buffering rod which extends to the ends of the vehicle frame where it is joined to suitable coupling means $c$ as shown in Fig. 3. The couplings and draw bars are supported in any suitable manner from the car frame as by the end sills $b$ and bearing members $z$ carried by the central girders $y$ which support the draw bars $k$, $k^1$ in a manner to prevent buckling thereof under buffing stresses.

If tractive or percussive forces preponderate on one side the vehicle will, by reason of the sliding friction of the friction elements on the cylinder wall, be moved along smoothly and not in jerks. If tractive or percussive forces arise on one side only, as will be the case, for instance, when separate vehicles are shunted one against another, the two springs including the frictional elements will be available for the reception and transmission of such forces to the vehicle underframe.

The second constructional form, shown in Figures 3 and 4, is simplified insofar as the draw-bar and buffering rods are each connected to one spring column only. The frictional elements are arranged between the spring columns, as before.

In detail the arrangement works as follows: The ends of the draw-bars $k$, $k^1$ lie in a bipartite casing $t$, $t^1$, held together by a sleeve $u$, consisting of two parts. In the casing are provided two spring columns $f$ and $f^1$, the first of which is connected to the draw-bar and buffering rod $k$, the second to the rod $k^1$, this connection being made through the spring plates $l$, $l^1$ and $m$, $m^1$. The spring plates $l$, $l^1$ bear against pressure sleeves $v$, $v^1$, so that the springs are compressed when pressure is applied. The forces are transmitted through the springs $f$, $f^1$ and the spring plates $m$, $m^1$ and force the frictional elements $o$ against the inner wall of the friction cylinder $p$.

Although the spring plates $l$, $l^1$ are thus moved from the abutments on the casing $t$, $t^1$ free movement of the vehicle relatively to the draw-bar and buffering arrangement will be prevented by the frictional elements. If tractive forces are applied the spring plates $m$, $m^1$ move from the frictional elements $o$ which remain uninfluenced and are merely held together by a spring ring $w$ provided inside them. As, however, the springs $f$, $f^1$ bear at their other ends against the abutments of the casing $t$, $t^1$, the vehicle remains yieldingly connected to the draw-bar and buffering rods even when tractive forces arise and the frictional elements are not operative, so that here again free uncontrolled play of the vehicle relatively to the draw-bar and buffering rods is prevented. The tractive forces are transmitted solely by the casing $t$, $t^1$ from the draw-bar $k$ to the draw bar $k^1$.

It has been found convenient to provide a sleeve $u$, known per se, for connecting the two portions of the casing $t$, $t^1$. This sleeve engages in recesses or openings in transverse plates $x$ which connect the longitudinal bearers or girders $y$ and establishes a connection between the vehicle and the draw-bar $k$, $k^1$. In order to avoid any excessive compression of the springs $f$ and $f^1$, stroke limiting tubes $z^1$ are provided.

Figures 5 and 6 show in longitudinal section two further constructions of the draw-bar and buffering apparatus with frictional elements.

In the construction shown in Figure 5 two sets of frictional elements $o'$, $o''$ are used and are located between the springs $f$, $f^1$ and the spring plates $m$, $m^1$. In the constructional form shown in Figure 6 an intermediate ring $o^2$ of polygonal cross section is also placed between the two frictional elements $o^3$, $o^4$ so that the inner bevelled ends of the frictional elements $o^3$, $o^4$ bear against the correspondingly shaped surfaces of the said intermediate ring $o^2$. In order to prevent wear and tear a friction cylinder $p$ is provided as in the arrangement shown in Figures 1 and 3. As in the construction shown in Figures 1 and 2 the frictional elements in the constructions shown in Figures 5 and 6 come into operation when tractive and also when buffeting forces arise in the draw-bar and buffeting rods. The forces are transmitted to the car frame as in Figs. 1 and 3.

I claim:

1. A draw-bar and buffering device, particularly for railway vehicles comprising draw-bar and buffer rods at the ends of the vehicle, spring mechanism connecting said rods and frictional elements interposed directly between the vehicle and the spring mechanism of the draw-bar and buffer rods.

2. A device according to claim 1, characterized by the fact that the frictional elements are arranged between two spring columns comprised in the spring mechanism.

3. A device according to claim 1 characterized by the fact that the spring mechanism is mounted on the underframe at the center of the vehicle and is connected to central buffer couplings by draw-bar and buffer rods extending from the ends of the car to the spring mechanism.

4. A device according to claim 1 characterized by the fact that the spring mechanism comprises a pair of spring columns and that the draw-bar and buffer rods extend through the spring columns of the spring mechanism.

5. A device according to claim 1 characterized by the fact that the spring mechanism comprises a pair of spring columns and that the draw-bar and buffer rods are, in each case, connected to one spring column only.

6. A device according to claim 1 characterized by the fact that the spring mechanism comprises an enclosing casing the two parts of which casing are connected by a sleeve.

7. A device according to claim 1 characterized by the fact that the spring mechanism comprises a two-part enclosing casing, the parts of which are joined by a sleeve and that the sleeve connecting the casing parts engages in recesses in transverse plates connecting the longitudinal bearers or girders of the vehicle underframe.

KARL SCHARFENBERG.